United States Patent [19]
Holcombe, Jr. et al.

[11] 4,087,573
[45] May 2, 1978

[54] ADHESIVE PLASTERS

[75] Inventors: Cressie E. Holcombe, Jr., Knoxville; Ronald L. Swain, Concord; John G. Banker, Kingston; Charlene C. Edwards, Knoxville, all of Tenn.

[73] Assignee: The United States of America as represented by the United States Department of Energy, Washington, D.C.

[21] Appl. No.: 617,126

[22] Filed: Sep. 26, 1975

[51] Int. Cl.² .................. C04B 35/50; C09K 3/00
[52] U.S. Cl. ...................... 427/372 R; 106/73.2; 106/286; 423/263; 428/539
[58] Field of Search .............. 106/286, 73.2; 423/21, 423/263; 252/313 R, 478; 428/408, 538, 539; 427/372 R

[56] References Cited
U.S. PATENT DOCUMENTS

| 3,123,576 | 3/1964 | Klein | 252/478 |
| 3,180,632 | 4/1965 | Katz | 428/408 |
| 3,476,691 | 11/1969 | Smith et al. | 252/313 R |

OTHER PUBLICATIONS

Chem. Abst. 66:110,532v 1967.
Chem. Abst. 63:9505f 1963.

Primary Examiner—Theodore Morris
Attorney, Agent, or Firm—Dean E. Carlson; Stephen D. Hamel; Allen H. Uzzell

[57] ABSTRACT

Adhesive plaster compositions are provided by treating particles of $Y_2O_3$, $Eu_2O_3$, $Gd_2O_3$ or $Nd_2O_3$ with dilute acid solutions. The resulting compositions have been found to spontaneously harden into rigid reticulated masses resembling plaster of Paris. Upon heating, the hardened material is decomposed into the oxide, yet retains the reticulated rigid structure.

5 Claims, 2 Drawing Figures

ADHESIVE PLASTERS

BACKGROUND OF THE INVENTION

This invention was made in the course of, or under a contract with the Energy Research and Development Administration.

It relates to an adhesive plaster composition for coating and fabricating operations, and more particularly to adhesive plasters formed by contacting $Y_2O_3$, $Eu_2O_3$, $Gd_2O_3$ and $Nd_2O_3$ powders with dilute acid solutions.

$Y_2O_3$ because of its refractory nature and its inertness to molten metals is a desirable material for coating surfaces (especially graphite) which contact molten uranium during alloying and nuclear fuel fabrication processes. $Eu_2O_3$ and $Gd_2O_3$ are particularly useful as coatings or fabrication materials for radiation shielding and nuclear reactor control rods because of the exceptionally high thermal neutron absorption cross-section of naturally occuring Eu and Gd particularly $^{153}$Eu and $^{157}$Gd. Neodymium oxide is useful for its thermal and electrical insulating properties in high temperature applications.

PRIOR ART

One method of coating graphite crucibles is disclosed in commonly assigned U.S. Pat. No. 3,660,075 to Harbur et al., issued May 2, 1972. The method therein disclosed involved spraying colloidal $Y_2O_3$ suspended in a $K_2SiO_3$ solution onto the desired surface with an inert gas sprayer. While this method is reportedly effective for preventing carbon contamination of the uranium from the crucible, some contamination from silicon in the coating will inevitably result.

SUMMARY OF THE INVENTION

It is an object of the present invention to provide spontaneously hardening adhesive compositions comprising $Y_2O_3$, $Nd_2O_3$, $Eu_2O_3$ or $Gd_2O_3$ which may be applied as surface coatings and subsequently decomposed in place to the pure oxide which remains firmly bound to the surface.

It is a further object to provide a simple, economical method for fabricating articles from $Y_2O_3$, $Nd_2O_3$, $Eu_2O_3$ or $Gd_2O_3$ powders.

It is still a further object to provide a neutron absorbing article fabricated from self-hardening compositions comprising $Eu_2O_3$ or $Gd_2O_3$.

These and other objects are accomplished by providing spontaneously hardening adhesive composition comprising a suspension of an oxide powder selected from the group $Y_2O_3$, $Eu_2O_3$, $Gd_2O_3$ and $Nd_2O_3$ in a plaster forming concentration of acid solution.

DETAILED DESCRIPTION

Figure 2:
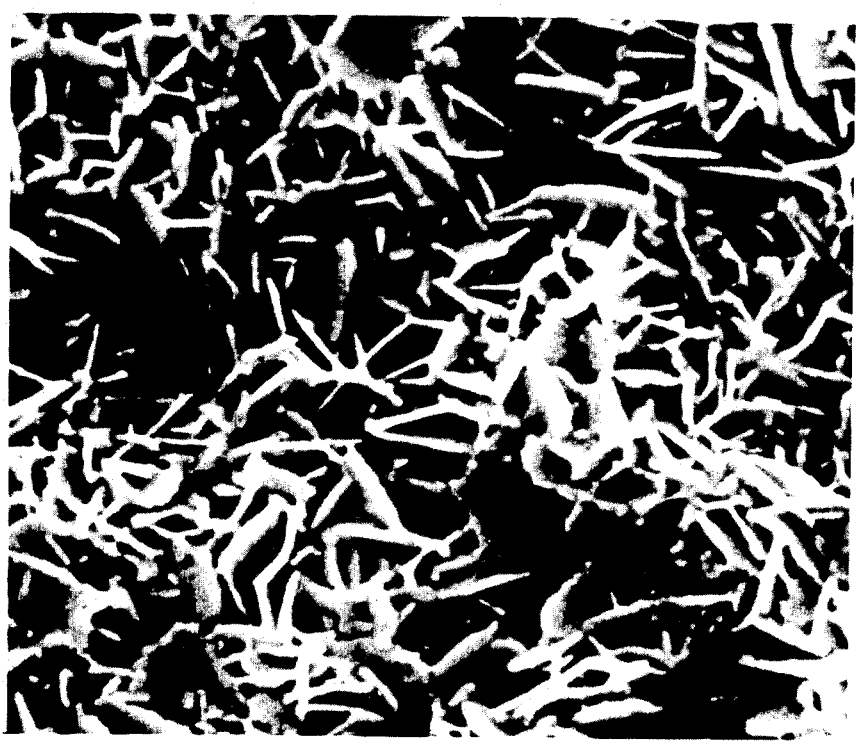
FIG. 2 is an electron micrograph of the hardened composition of FIG. 1 after sintering, which now consists solely of $Y_2O_3$.

One inventive aspect of this invention is the discovery that four oxides; $Y_2O_3$, $Eu_2O_3$, $Gd_2O_3$ and $Nd_2O_3$ have a somewhat remarkable property in common. It has been found that when powders of these four oxides are contacted with dilute acids and agitated to form a suspension (either a slurry or a colloidal dispersion) that the resulting suspension, after a short fluid period (during which it may be applied to a surface or cast to a desired shape) and a short plastic period, will spontaneously harden into a rigid porous mass. This rigid material has a microstructure resembling that of plaster of Paris. While the composition of these materials of this invention is somewhat complex and undetermined, the materials will lose weight upon heating until they are eventually decomposed into the initial oxides.

Another aspect of this invention is the discovery that unlike plaster of Paris which fragments upon decomposition, the rigid material of this invention retains its needle structure during decomposition, and upon further heating above 1000° C, the needles become more firmly bound together to provide a porous reticulated article having an appearance similar to ordinary blackboard chalk.

A further aspect of this invention is the discovery that the spontaneously hardening compositions of this invention during their fluid periods are adhesive and may be applied to a surface as a coating, in a like manner as paint. If the coated surface is heated to at least 1000° C for sufficient time to firmly bind the needles together, the composition decomposes to the orginal oxide which surprisingly remains firmly bound to the surface as a tough porous oxide coating.

The spontaneously hardening composition made from $Y_2O_3$ is particularly useful in a method for coating graphite crucibles used in uranium melting operations for nuclear fuel fabrication. Because $Y_2O_3$ isn't wet by molten uranium, the sintered $Y_2O_3$ coating of this invention, though highly porous, is nevertheless effective as a crucible liner to prevent carbon contamination. This $Y_2O_3$ coating is much tougher than other coatings and is more easily repairable. Of particular use in uranium melting operations is a coating composed of a mixture of $Y_2O_3$ and $UO_2$. This coating may be made according to the present invention by initially providing a mixed suspension of up to 2 moles $UO_2$ per mole of $Y_2O_3$ in dilute acid. Coatings of $Eu_2O_3$ and $Gd_2O_3$ for nuclear shielding or reactor control rods and $Nd_2O_3$ for thermal and electrical insulators may be applied in a like manner as the $Y_2O_3$ coating above.

In addition to coating applications, the self-hardening compositions of this invention provide a simple inexpensive fabrication technique for porous articles. The four oxides exhibiting this self-hardening behavior all have good insulating properties, so poruos reticulated structures are very useful as electrical and thermal insulators and high temperature resistors.

As mentioned above, Gd and Eu, because of their exceptionally high nuclear shielding ability are very effective when incorporated into structural or shielding materials in the nuclear industry. A simple inexpensive fabrication technique for structures containing these elements has long been needed. Since it is the nuclear properties of these elements which are of interest, the chemical or physical form is relatively unimportant. The self-hardening composition of this invention comprising $Eu_2O_3$ or $Gd_2O_3$ would be effective as shielding without any heat treatment whatsoever. All that is needed is that the self-hardening composition be formed or cast into the desired shape of a neutron absorbing article (reactor control rods, structural brick, or even prefabricated structural components such as doors, beams, walls, etc.) and placed in the appropriate shielding position. For purposes of this disclosure, a neutron absorbing article is any article, regardless of shape, which is composed at least partially of material of high neutron absorption cross-section such as $Eu_2O_3$ and $Gd_2O_3$. If pure $Gd_2O_3$ or $Eu_2O_3$ is required for a particular application, the hardened materials may be heated as shown herein and be decomposed to the pure oxide.

The self-hardening composition of this invention may contain other non-hardening components such as $UO_2$, CaO or other compatible materials and still demonstrate spontaneous hardening. The hardened material would exhibit the needle structure with the non-hardening component suspended within the needle structure, or as a mixed oxide crystal such as $CaY_2O_4$, $CaY_4O_7$, etc.

The self-hardening compositions of the present invention are prepared by contacting powders of $Y_2O_3$, $Gd_2O_3$, $Eu_2O_3$ or $Nd_2O_3$ with a dilute acid solution and agitating to bring the particles into a suspension (either a slurry or a colloidal dispersion) which soon spontaneously hardens. The agitation is only necessary to bring particles into suspension and the means of agitation is not critical. The particle size is not critical; however, finer particles result in a better article with a more strongly bound structure. The preferred particle diameter is less than 25 microns (equivalent area diameter) with 3–10 microns being optimum. When particles less than 25 microns are used, they are brought into a white homogeneous colloidal dispersion resembling milk (except for $Nd_2O_3$ which is blue in color).

The duration of the fluid period is somewhat dependent upon the acid concentration, with more dilute acids generally providing longer fluid periods. It is important that the acid not be too concentrated, or the oxides will go into solution and not harden at all.

Generally speaking, acid concentrations greater than 6 M will dissolve the oxides particles and will not result in a spontaneously hardening composition. The preferred acid concentration for an easily workable mixture is 2.63 M. The preferred acids are nitric and hydrochloric, but other acids such as HBr, HI, $HClO_3$ etc. are suitable. It has been found that acids which have a strong affinity for water such as $H_2SO_4$, $H_3PO_4$ etc. do not form the self-hardening composition.

In order to form easily workable plaster-forming compositions, there must be sufficient liquid present to form a fluid slurry or colloidal dispersion. This may be easily determined by routine testing using various acid concentrations. If too little liquid is present, a material resembling modeling clay results. Adding more liquid will disperse the clay-like material to form a workable fluid. If too much liquid is present, the excess will remain above the hardened material. The acid to powder proportions demonstrated in the subsequent examples demonstrate operable conditions for easily workable suspensions.

The following examples are carried out in air at room temperature and exhibit preferred operative methods of forming the self-hardening compositions of this invention. Those skilled in the art may vary the compositions and acid concentration to suit their particular applications with the benefit of this disclosure.

EXAMPLE I

Fifty-nine cc of 3.16 M $HNO_3$ was added slowly to 41 grams of $Y_2O_3$ powder having a mean agglomerate diameter of 3.5 microns with particles within the agglomerates being 100% less than 0.05 microns. The mixture was stirred until the powder became suspended in the solution. The resulting suspension, which resembled milk in appearance, was poured into a fluorocarbon-lubricated mold and allowed to harden. Twenty minutes were required for the suspension to set up into a rigid material. The material was removed from the mold and dried at 50°–60° C for 24 hours. The material was then sintered in argon at a heating rate of 200° C/hr. and held at 1100° C for 1 hour, followed by cooling at a similar rate. The sintering atmosphere is not critical and air may be used. The properties of the material as measured by a Mercury Intrusion Porosimeter are given in the following table.

TABLE

| | Before Sintering | Sintered |
|---|---|---|
| % Porosity | 57.8 | 70.1 |
| Average Pore Diameter (microns) | 1.9 | 2.6 |
| % Porosity less than 10 microns | 99.0 | 97.3 |
| Surface Area (m$^2$/g) | 11.8 | 6.0 |

Figure 1:
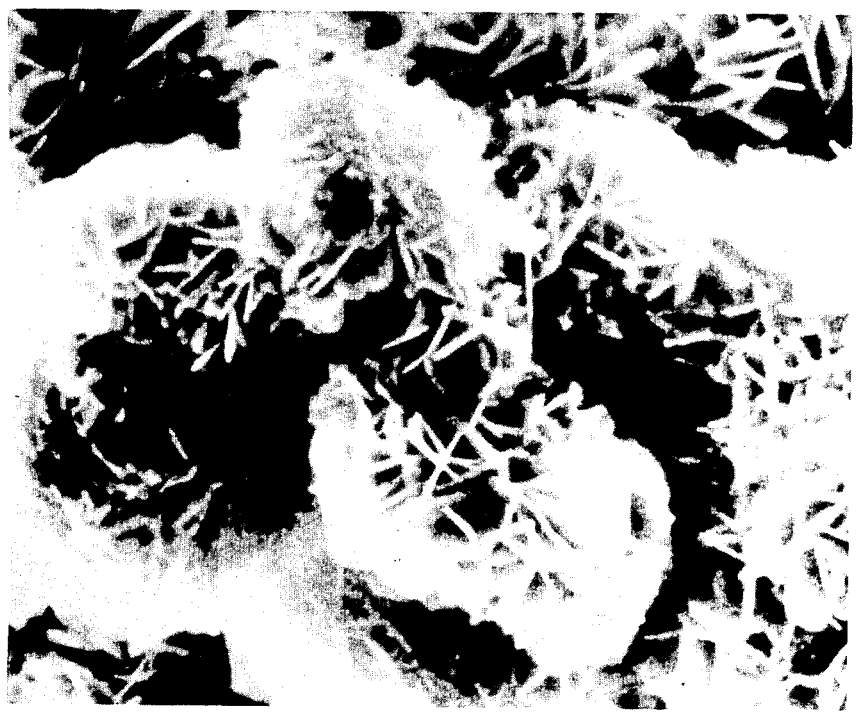
FIG. 1 is an electron micrograph of a hardened composition prepared by suspending $Y_2O_3$ in $HNO_3$ as in Example I.

FIG. 1 is an electron micrograph (10,000X) of the material before sintering showing the interlocking needle structure which is bound by a hazy material. FIG. 2 is the same material after sintering. The hazy structure has disappeared and now plates as well as needles appear in the microstructure. It is thought that the disappearance of the fine haze accounts for the decrease in surface area and increase in porosity.

EXAMPLE II

One hundred cc of 2.01 M HCl was added slowly to 100 grams of $Y_2O_3$ powder having a means agglomerate diameter of 3.5 microns with particles within the agglomerate 100% less than 0.05 microns. The mixture was stirred until the powder became suspended in the acid solution. The resulting milky suspension set up spontaneously into a plaster-like material identical in appearance to that of Example I. Electron microscopy revealed, however, that the needles of the microstructure were about ½ the length of those of Example I.

EXAMPLE III

Five grams of europium oxide were added to 10 ml. cc of 1.2 M $HNO_3$. An exothermic reaction was noted with the addition of europium oxide. The mixture spontaneously hardened into a plaster-like composition in about 20 minutes. The plaster was examined with a scanning electron microscope which indicated the needle size of the composition was similar to yttrium oxide plaster. The $Eu_2O_3$ plaster would be decomposed to $Eu_2O_3$ yet retain its needle shape should it be heated to 1000°–1400° C for sufficient time to firmly bind the needles together.

EXAMPLE IV

Twenty-five grams of gadolinium oxide were added to 15 ml. of 1.9 M $HNO_3$. Upon stirring, a hard plaster-like composition is spontaneously formed in about 3 minutes.

The plaster-like composition was examined with a scanning electron microscope. The examination indicated that the needle size of the composition was smaller than in the yttrium oxide composition by a factor of 10. The $Gd_2O_3$ plaster would likewise be decomposed to $Gd_2O_3$ yet its needle shape upon heating to 1000°–1400° C for sufficient time to firmly bind the needles together.

EXAMPLE V

Seventeen grams of neodymium oxide were added to 10 milliliters of 2.63 M nitric acid. After the mixture was stirred, a hard plaster-like composition was spontaneously formed in about 15 minutes.

The plaster-like composition was examined with a scanning electron microscope and the examination inidicated that the needle size of the formed composition was larger than the yttrium oxide composition by a factor of about 10. This $Nd_2O_3$ plaster would likewise decompose to $Nd_2O_3$ yet retain its needle behavior upon heating to 1000°–1400° C for sufficient time to firmly bind the needles together.

The following example illustrates the use of a self-hardening composition in a coating method. The example demonstrates a $Y_2O_3$ - $UO_2$ coating for graphite, as it is useful for uranium melting operations. $Eu_2O_3$, $Gd_2O_3$, $Nd_2O_3$ and pure $Y_2O_3$ may be applied as coatings in a like manner for appropriate applications.

EXAMPLE VI

As a demonstration of a coating method, 50 cc of 2.63 M nitric acid solutions was slowly added to 50 g. of mixed (1 to 1 mole ratio) $Y_2O_3$ and $UO_2$ powder, with the $Y_2O_3$ powder having a mean agglomerate diameter of 3.5 microns and the individual particles having a mean diameter of 0.05 mircons. The mean diameter of $UO_2$ particles was 21.3 microns. The mixture was stirred until the powder became suspended in the solution and was brushed onto the surface of a graphite article. About 15 minutes was required for the suspension to spontaneously harden into a rigid coating. The coated article was placed in an electric furnace and heated to 1400° C in argon atmosphere. Heating rate was 300°–400° C per hour. Upon cooling at a similar rate the coating was adherent with no cracking and was tougher than other materials previously used to coat graphite crucibles in uranium melting operations.

The following example will illustrate a general fabrication method applicable to each of the four oxides. A method of fabricating neutron absorber bricks from $Gd_2O_3$ will be presented. Similar absorbers of $Eu_2O_3$ (or mixtures containing $Y_2O_3$ or $Nd_2O_3$ to control absorption) or articles $Y_2O_3$ or $Nd_2O_3$ of various shapes such as high temperature insulators may be fabricated in a like manner by varying the ratio of acid to oxide to form easily pourable compositions.

EXAMPLE VII 25 kg. of $Gd_2O_3$ powders is added to 15 liters of 2.0 M nitric acid. The resulting composition is stirred to suspend the particles and poured into a fluorocarbon-coated sectional mold having appropriately shaped sections. After 2 to 3 minutes the composition spontaneously hardens. The bricks are easily removed from the mold and are now ready for use. The bricks may be used as shielding merely by stacking or by cementing, for example, with the spontaneously hardening $Eu_2O_3$ or $Gd_2O_3$ composition of this invention during its fluid period.

It should be understood that the spontaneously hardening composition of this invention is not formed by dissolving the oxide powders in acid, but by suspending the powders (either forming a slurry or a colloidal suspension) in dilute acid. For purposes of this disclosure dilute acid is to be interpreted to mean acid (generally less than 6 M) which is not sufficiently concentrated to bring the oxide powders into solution. If the acid is too dilute (generally less than 0.5 M) the self-hardening plaster will not result. Therefore, the concentration of acid used in forming the self-hardening compositions of this invention may be properly defined as a plaster-forming concentration, generally being greater than 0.5 M and less than 6.0 M.

The quantity of acid necessary to form the plaster may vary somewhat from acid to acid or from oxide to oxide. This quantity, of course, may be rountinely determined by those skilled in the art of forming cements, plasters, and the like. All that is required for the operability of our invention in all of its aspects is that the oxide powder be contacted with a sufficient quantity of a plaster-forming concentration of acid to result in the formation of a self-hardening composition having a fluid period of limited duration.

The hardening mechanism of the oxides and the effects of sintering are not yet fully understood. It is believed that the dilute acid acts as a catalyst by activating the particle surface causing the formation of a hydrated species having the needle-like crystal structure. Articles formed from slurries of $Y_2O_3$ in $HNO_3$ and HCl were analyzed by differential thermal and thermogravimetric quadrapole mass spectrographic analyses. It was observed that the $HNO_3$ composition loses weight, primarily water, oxygen, and NO from 110° C until 600° C. When pure $Y_2O_3$ remains (as determined from x-ray diffraction patterns). The HCl composition begins losing weight at 135° C and continues to lose weight, primarily water, until 400° C until pure $Y_2O_3$ remains.

After decomposition, the oxides are very brittle and easily fragmented until sintering temperature is reached, about 1000° C. It is believed that the broad temperature range over which the decomposition occurs allows the composition to retain its structural integrity until the crystals became more firmly bound together upon sintering. Therefore, in fabricating articles of the composition this invention, for low temperature applications, below 100° C, and where purity is not essential, e.g. radiation shielding, they need not be decomposed to the oxide. If they are to be used in high temperature applications, or where purity is essential they should be heated to above 1000° C for at least about 1 hr. to cause the needles to be firmly bound together whereby the article will be decomposed to the oxide form.

As a preferred embodiment in order to minimize cracking in coatings and articles prepared according to this invention, the heating cycle should be as follows:

heat to 600° C at 10° C/hr.; heat to 1350° C at 50° C/hr; hold for 1 hr. at 1350° C; and cool to room temperature at 50° C/hr. An average shrinkage of 25% is observed. If the compositions are heated above about 1400° C, the needle structure disappears with a shrinkage of about 33% and some cracking. Because of the very uniform porosity of the sintered articles prepared from the subject compositions, they are useful as high temperature-acid resistant slip casting molds or as thermal insulators for vacuum furnaces. In addition the small uniform pores of both the sintered and unsintered articles render them useful in microfiltration as a substitute for fritted glass filters.

The behavior of $Y_2O_3$, $Gd_2O_3$, $Eu_2O_3$, and $Nd_2O_3$ in forming plasters is to be regarded as both surprising and unexpected. Perhaps equally remarkable is the fact that oxides of scandium and the remaining lanthanides did not exhibit similar behavior. We know of no other instance where the four oxides of this invention exhibit a property not shared with scandium or other members of the lanthanide series. This indicates that $Y_2O_3$, $Eu_2O_3$, $Gd_2O_3$ and $Nd_2O_3$ exhibit an equivalence, as disclosed herein, which is heretofore unrecognized.

What is claimed is:

1. A spontaneously hardening composition of matter comprising a suspension of an oxide powder selected from the group of $Y_2O_3$, $Eu_2O_3$, $Gd_2O_3$ and $Nd_2O_3$ in a solution of 0.5-6M acid, said acid selected from the group of $HNO_3$, $HCl$, $HBr$, $HI$, and $HClO_3$.

2. A method of applying a coating comprising an oxide selected from the group of $Y_2O_3$, $Eu_2O_3$, $Gd_2O_3$ and $Nd_2O_3$ to a surface said method comprising the steps of:
  a. providing the composition of claim 1, said composition having a fluid period of limited duration,
  b. applying said composition during the fluid period to said surface, and
  c. allowing the composition to harden into a rigid coating having a microstructure of interlocking needles.

3. The method of claim 2 further comprising after the composition is allowed to harden, heating the coating surface to 1000°–1400° C for sufficient time to bind the needles together whereby the rigid coating is decomposed to form a coating of the selected oxide.

4. A method of fabricating articles comprising an oxide selected from the group of $Y_2O_3$, $Eu_2O_3$, $Gd_2O_3$ said method comprising
  a. providing the composition of claim 1, said composition having a fluid period of limited duration;
  b. forming said composition into the desired shape during the fluid period, and
  c. allowing the composition to harden into a rigid material having a microstructure of interlocking needles, thereby forming a porous article.

5. The method of claim 4 further comprising heating said porous article to 1000°–1400° C for sufficient time to bind the needles together thereby providing a rigid porous article of the selected oxide.

* * * * *

UNITED STATES PATENT OFFICE
CERTIFICATE OF CORRECTION

Patent No. 4,087,573           Dated May 2, 1978

Inventor(s) Cressie E. Holcombe, Jr. et al.

It is certified that error appears in the above-identified patent and that said Letters Patent are hereby corrected as shown below:

Column 8, line 5 for "coating" read ---coated---

Column 8, line 10 following "$Gd_2O_3$" add ---and $Nd_2O_3$---

Signed and Sealed this

Third Day of April 1979

[SEAL]

Attest:

RUTH C. MASON
Attesting Officer

DONALD W. BANNER
Commissioner of Patents and Trademarks